Patented Feb. 17, 1931

1,793,311

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

SYNTHETIC RESIN COMPLEX FROM CHLORINATED TOLUOL AND PHENOL AND PROCESS OF MAKING SAME

No Drawing.     Application filed May 12, 1924. Serial No. 712,548.

This invention relates to a synthetic resin complex including compositions derived therefrom and to the process of making same and relates especially to a product in the preparation of which side-chain chlorinated toluol, side-chain chlorinated xylol and the like is an essential reagent.

Thus pure toluene or preferably commercial toluene containing some xylene may be chlorinated under the usual conditions to obtain principally side-chain chlorination. A product which for example has a specific gravity of 1.34 may be employed. A higher degree of chlorination with corresponding increase in specific gravity is frequently desirable.

When ordinary phenol is allowed to react with this material reaction takes place on warming and hydrochloric acid is evolved. The reaction mixture may be boiled during which time there appears to be a second stage involving a slight evolution of water. The semi-liquid or soft semiviscid material obtained containing a red dyestuff may be subjected to a vacuum to remove most of the hydrochloric acid and steam distilled to eliminate any unaltered phenolic bodies. It is desirable to free the viscid material entirely from phenol and if the reaction is not carried to the point where all such phenolic substances are eliminated then steam distillation will serve to remove the last traces. Usually the reaction may be carried out in the case of phenol to reduce the latter down to 2 per cent or so and a short exposure to steam under usual distilling conditions eliminates such phenol effectively. At the close of the distillation the condensed steam will be found neutral.

For resinification of the syrupy or viscid product formaldehyde may be used to advantage. Furthermore the procedure involved herein does not preclude the use of other aldehydes or mixtures of aldehydes such as acetaldehyde, paraldehyde, butyl aldehyde, acrolein, benzaldehyde and the like in so far as they may be appropriate for the purpose.

The preferred product of the present invention is one which has the property of hardening when subjected to heat so that the material may be employed usefully as a binder for the filling material in producing molding compositions which will set on hot-pressing and can be taken from the mold while hot due to the fact that they have become thermo-rigid by the heat treatment.

In the present invention employing the new material aforesaid a relatively small proportion of formaldehyde suffices to yield a resin which has hardening properties and which is especially suitable for making thermo-rigid molded articles by the addition of a moderate amount of hexamethylenetetramine.

In some cases formaldehyde may be omitted and solely hexamethylenetetramine employed. The latter however is ordinarily not advantageous on the score of cost and furthermore the presence of any large amount of ammonia in the final product is undesirable.

For example I may treat 100 parts by weight of the aforesaid syrupy or viscid material with 25 parts of ordinary (40%) aqueous formaldehyde corresponding to only 10 per cent of actual formaldehyde. This mixture may be boiled under a reflux condenser for 2 or 3 hours and the resulting resinous product then freed from water. In this form it may be dissolved in a solvent such as alcohol and incorporated with a suitable filler such as asbestos flour or fibre or other mineral filler or vegetable fibres such as linters, wood flour, cotton flock and the like. 5 to 10 per cent of hexamethylenetetramine based on the weight of the resin may be incorporated. The solvent is removed by evaporation, preferably in a vacuum dryer. The resulting composition is pulverized or ground and may then be placed in molds in a hot press and molded to suitable shapes. The setting takes place rapidly and in from 2 to 5 minutes, in the case of small articles a rigid product of good surface finish is obtained by molding at a temperature of 150–160° C.

Various coloring agents, dyes and the like may be introduced when special colors are required.

A product may be made from orthocresol by mixing 158 grams of this substance with 100 grams of chlorinated toluol which has been chlorinated under conditions to effect principally side-chain reaction and which has a specific gravity of 1.35 and of which 42 per cent boils between 205–212° C., and 22 per cent boils between 212 and 215° C. On slightly warming this mixture the evolution of hydrochloric acid begins and the source of heat is removed. The reaction goes on spontaneously and smoothly for about 20 minutes during which time the temperature may rise through the heat of reaction to about 70° C. The weight of the mixture now is 235 grams indicating a loss in weight due to the evolution of hydrochloric acid amounting to 23 grams. The product is a deep cherry-red thick syrup. It is slightly acid due to some residue of hydrochloric acid. This red syrup or dyestuff is insoluble in water but soluble in acetone, alcohol, benzol and various other solvents. The solutions are yellowish but the product dyes the skin or cotton cloth a pink color. The syrup does not solidify on cooling. It exhibits no coloration with the usual ferric chloride test for phenols made under conditions most favorable for detecting the presence of phenolic bodies.

When the red dyestuff syrup is heated further there is an additional evolution of hydrochloric acid. This ceases as the temperature is raised and a product is obtained weighing 210 grams indicating a loss due to the evolution of hydrochloric acid, totalling 48 grams. When the temperature is raised to 205° C. a crackling noise is heard in the flask in which the reaction is carried out, due to the formation of water. On heating for about 40 minutes at this temperature the reaction evolving water ceases and the temperature may be raised to 215° C. for 15 or 20 minutes longer.

This heat treatment thickens the syrup to a more consistent product which will barely flow at room temperature. In this form the material has a variety of uses.

Boiled for an hour with one-fourth its weight of ordinary aqueous formaldehyde of 40 per cent strength a dark brown hard resin results. (The proportion of formaldehyde may be varied if desired.) This neutral resin may be incorporated with a filler and a few per cent of hexamethylenetetramine. Other resins natural or synthetic may be added in some cases. Resins of the same general type may be prepared from meta and para cresol, naphthols etc. or mixtures of these with phenol. Likewise the commercial forms such as tar acids, cresylic acid, creosote oils etc. may be converted to resins.

It should be noted that while carbolic acid or ordinary phenol and ortho, meta and para cresol are corrosive or caustic in their action on living tissue, the reaction product of, for example, orthocresol with the chlorinated toluene (after removal of hydrochloride acid) has no caustic corrosive action and may remain on the hands for hours without unpleasant effect. Thus I am able to transform carbolic or cresylic acid so completely that a harmless substance results, namely, a new chemical material in the form of a non-corrosive, semi-liquid product, adapted for making resins.

Also I may add that the red semi-liquid or syrup first obtained simply by spontaneous reaction will dye human or vegetable tissue a red or rose color.

The red syrup also is reactive with formaldehyde without the heat treatment described above.

What I claim is:—

1. The process of making a resin which comprises reacting on phenol in the proportion of 3 mols. with crude benzotrichloride in the proportion of 1 mol. to form a non-corrosive, semi-liquid reaction product, reacting on this product with aqueous formaldehyde to yield a resinous substance and incorporating the latter with hexamethylenetetramine.

2. The process of making a resinous substance adapted to become thermo-rigid on heating which comprises treating phenol with side-chain chlorinated toluol containing benzotrichloride to form a semi-liquid non-corrosive material, reacting on said material with formaldehyde, using approximately 10 per cent of actual formaldehyde, whereby a resin is obtained and incorporating said resin with extraneous material including a few per cent of hexamethylenetetramine.

3. A process of making a resin by reacting with a phenol upon a side chain chlorinated product of toluol containing benzotrichloride as a major constituent, to form a syrupy viscous product, and reacting on the latter with an aldehyde to form a resin.

4. In the process of making resin the steps of forming an intermediate product which comprises reacting on carbolic acid with benzotrichloride to substantially convert the carbolic acid to a bland, neutral product with the evolution of hydrochloric acid and reacting upon such bland neutral product with formaldehyde to form a resin.

5. In the process of making synthetic resin the steps which comprise reacting with side-chain chlorinated toluol containing benzotrichloride on a single ring phenolic body in such proportions as to form a non-corrosive bland syrupy product and reacting upon the latter with about 8 to 12% of its weight of formaldehyde.

6. In the process of making synthetic resins the step which comprises reacting on carbolic acid (phenol) one mol. with benzotrichloride approximately three mols. to eliminate chlorine as hydrochloric acid and to form a non-corrosive bland syrupy product serving as the raw material and reacting thereupon with an aldehyde to form a resin.

7. A resin formed by combining an aldehyde with the bland products of reaction of one mol. of benzotrichloride on three mols. of phenol.

8. The products of reaction of approximately one mol. side-chain chlorinated toluol on three mols. of a single ring phenolic body combined with an aldehyde.

9. A resin formed by combining an aldehyde with the bland products of reaction of one mol. of benzotrichloride on three mols. of a simple single ring phenol.

10. A process which comprises reacting upon a phenol with side-chain chlorinated toluol, to form a substantially noncorrosive dyestuff-containing material, and reacting upon the latter with a small amount of formaldehyde.

11. A process which comprises reacting upon a phenol with benzotrichloride to form a substantially non-corrosive dyestuff-containing material, and reacting upon the latter with a small amount of formaldehyde.

12. A resin formed by combining an aldehyde with the bland products of reaction of one mol. of benzotrichloride on three mols. of a phenol.

13. A resin formed by combining formaldehyde with the bland products of reaction of one mol. of benzotrichloride on three mols. of phenol.

14. The process of making a resin which comprises reacting on phenol with a side-chain chlorinated toluol, in which benzotrichloride constitutes the predominating constituent and which also contains other chlorinated toluols, to form a non-corrosive, semi-liquid reaction product, reacting on this product with aqueous formaldehyde to yield a resinous substance and incorporating the latter with hexamethylenetetramine.

15. A new chemical material adapted for use in the molding industry comprising the reaction product of a syrupy viscous condensation product of approximately 1 mol. of benzotrichloride and 3 mols. of a single ring phenol combined with formaldehyde, thereby forming a resin.

16. As a new synthetic resin complex adapted for use in the molding industry, formaldehyde combined with a non-corrosive liquid syrupy viscous reaction product of benzotrichloride and carbolic acid in the proportion of approximately 1 mol. of the former to 3 mols. of the latter.

17. The syrupy reaction product of 1 mol. of benzotrichloride and about 3 mols. of a single ring phenol combined with 10 per cent of its weight of (actual) formaldehyde, being a resin capable of becoming thermo-rigid on heating in the presence of a few per cent of hexamethylenetetramine.

18. The herein described new synthetic resin being a resin complex comprising the reaction product of phenol, benzotrichloride and formaldehyde.

19. The herein described new synthetic resin being a resin complex comprising the reaction product of phenol, mixed side-chain-chlorinated-toluol in which benzotrichloride predominates and formaldehyde.

20. The herein described resin formed by reaction of the syrupy viscous condensation product of benzotrichloride and phenol, with formaldehyde.

CARLETON ELLIS.